United States Patent [19]

Trammel et al.

[11] Patent Number: 4,467,914
[45] Date of Patent: Aug. 28, 1984

[54] MEANS FOR ALIGNING AND SECURING ADJACENT CONVEYOR TROUGH STRUCTURES

[76] Inventors: Edward L. Trammel, 400 W. Central, Wichita, Kans. 67203; Hugh D. Kelley, 1451 Morgantown, Wichita, Kans. 67212

[21] Appl. No.: 942,924

[22] Filed: Sep. 18, 1978

[51] Int. Cl.³ .......................................... B65G 21/10
[52] U.S. Cl. .................................. 198/861; 138/155; 198/583
[58] Field of Search ............... 198/735, 583, 584, 758, 198/860, 861, 841; 138/155; 285/24, 27, 405, 424; 403/367

[56] References Cited

FOREIGN PATENT DOCUMENTS 1088870  9/1960  Fed. Rep. of Germany ...... 198/735
2342750  3/1975  Fed. Rep. of Germany ...... 138/155

Primary Examiner—E. R. Kazenske
Assistant Examiner—Douglas D. Watts
Attorney, Agent, or Firm—Phillip A. Rein

[57] ABSTRACT

This invention is a means for aligning and securing adjacent conveyor trough structures which involves a conveyor trough means of specific design and an alignment and anchor wedge member that is easily usable to assure proper rigid connection and alignment of adjacent conveyor trough means. The alignment and anchor wedge member is of a special design and driven as a wedge between adjacent ends of the conveyor trough means to be interconnected and acts to positively align the conveyor chain support members which is of extreme importance to reduce wear and maintenance.

5 Claims, 9 Drawing Figures

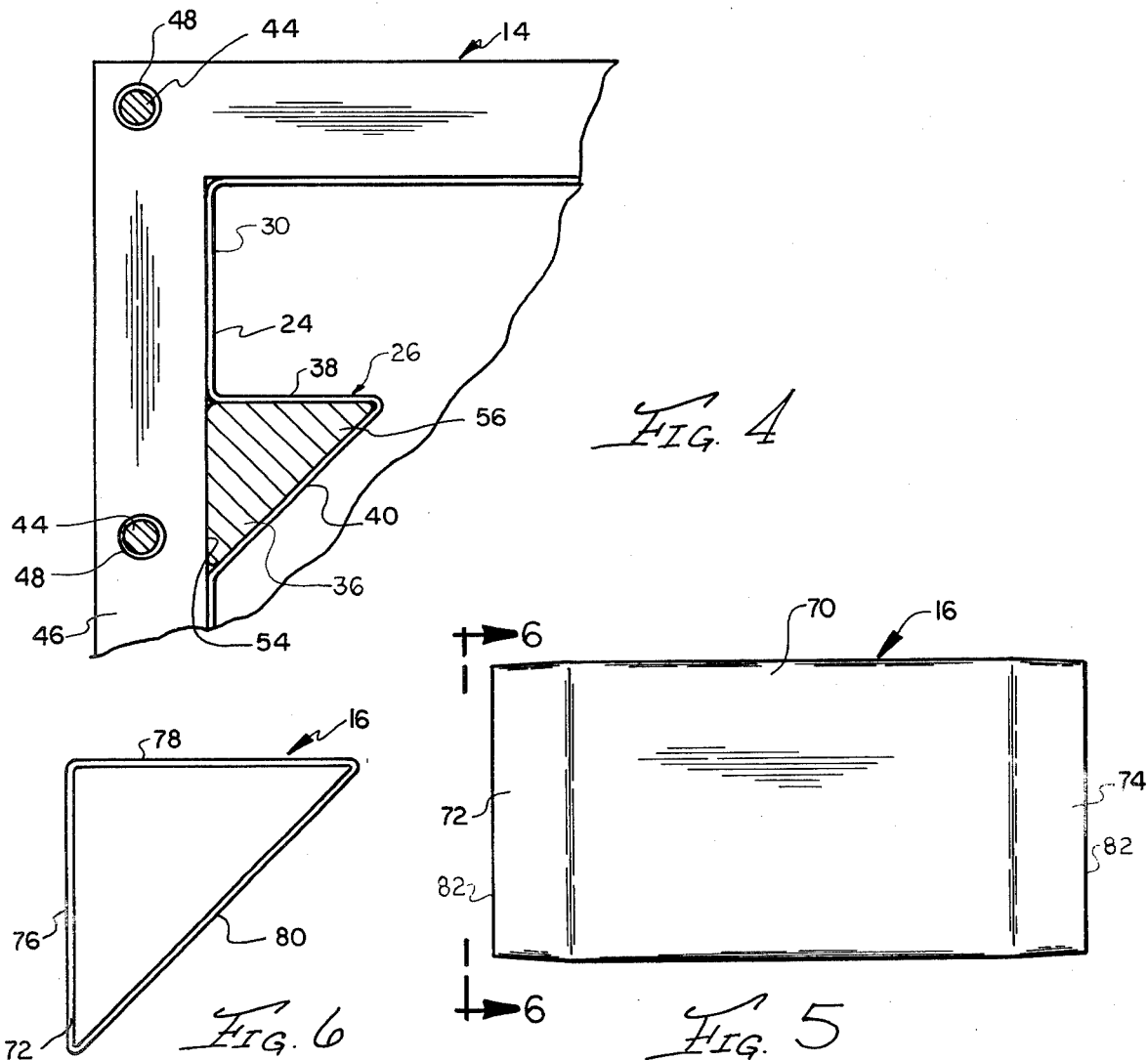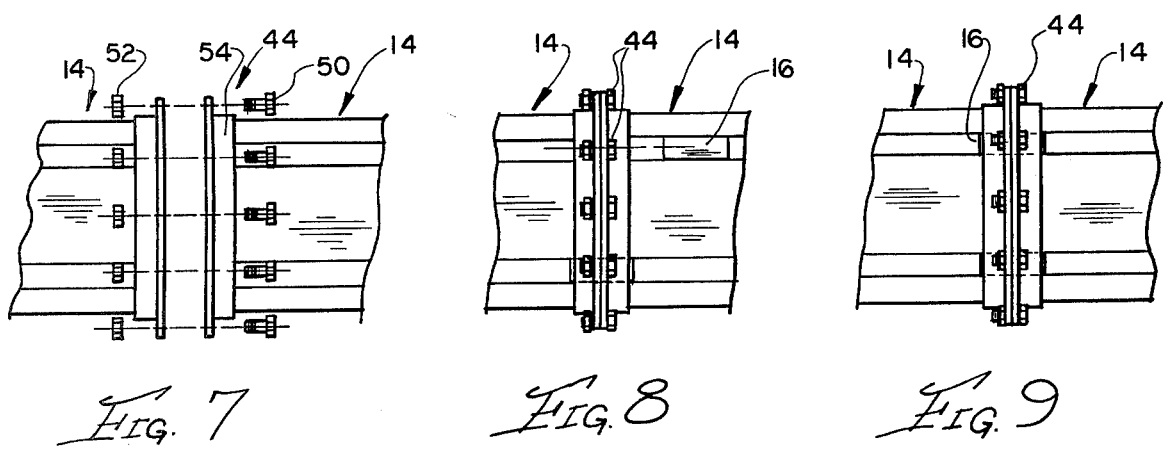

ND SECURING
MEANS FOR ALIGNING AND SECURING ADJACENT CONVEYOR TROUGH STRUCTURES

PRIOR ART

A comparison of the invention herein to the prior art is not available as a patent search was not conducted. However, it is felt by the experience of the applicant, that the use of a special designed alignment and anchor wedge member to interconnect adjacent conveyor trough means is not being done in the art.

An important function in the conveyor field is being accomplished by the claimed invention herein and no knowledge of a similar system and structure is possessed by the applicant herein.

PREFERRED EMBODIMENT OF THE INVENTION

In one preferred embodiment of the invention, a means for aligning and securing adjacent conveyor trough structures, includes a plurality of conveyor trough means interconnected through the use of alignment and anchor wedge members. Each conveyor trough means include (1) a main conveyor assembly; (2) a connector flange assembly secured to each opposite end of the main conveyor assembly; and (3) support leg assemblies connected to said main conveyor assembly to hold same in an elevated position. The main conveyor assembly includes a main body member having integral conveyor chain support members formed in upright sidewalls thereof. The main body member is further provided with a top wall connected by the sidewalls to a bottom wall to convey grain and the like therethrough. A transverse cross section of each conveyor chain support member shows a horizontal section perpendicular to the respective sidewalls and an integral inclined section. The inclined sections are integral at one end to an inner end of the horizontal sections and connect at the other end to the respective sidewalls. The connector flange assembly are each constructed of an angle iron member contacting the periphery of the outer surface of the main body member. Each of the connector flange assemblies include a main flange member having an upright leg formed with connector holes therein to receive nut and bolt members therein to connect with an adjacent connector flange assembly. Each support leg assembly includes a leg member having an upper connector end section and a lower, horizontal support plate. The support leg assemblies are used to hold the main conveyor assembly in the desired height arrangement. The alignment and anchor wedge member includes a main body section having tapered outer end sections. The main body section is of triangular shape in transverse cross section to resemble a similar shape between the conveyor chain support member and adjacent portion of the main flange member. The adjacent main flange members are loosely connected by the nut and bolt members and, then the alignment and anchor wedge members are driven into position to align adjacent ones of the conveyor chain support members. Then, the nut and bolt members are tightened and the process repeated at each junction of the connector flange assembly to one another.

OBJECTS OF THE INVENTION

One object of this invention is to provide a means for aligning and securing adjacent conveyor trough structures that is simple in operation and achieves exact alignment.

Another object of this invention is to provide a means for aligning and securing adjacent conveyor trough structures utilizing a special wedge member to align adjacent conveyor tracks.

Still, one other object of this invention is to provide a means for aligning and securing adjacent conveyor trough structures that is easy to use, sturdy in construction, and overcomes variances in tolerances to achieve alignment of adjacent conveyor trough structures.

Various other objects, advantages, and features of the invention will become apparent to those skilled in the art from the following discussion, taken in conjunction with the accompanying drawings, in which:

FIGURES OF THE INVENTION

FIG. 4 is an enlarged fragmentary view of a portion of the structure shown in FIG. 3;

FIG. 5 is a side elevational view of an alignment and anchor wedge member of this invention;

FIG. 6 is an end view taken along line 6—6 in FIG. 5; and

Figure 1:
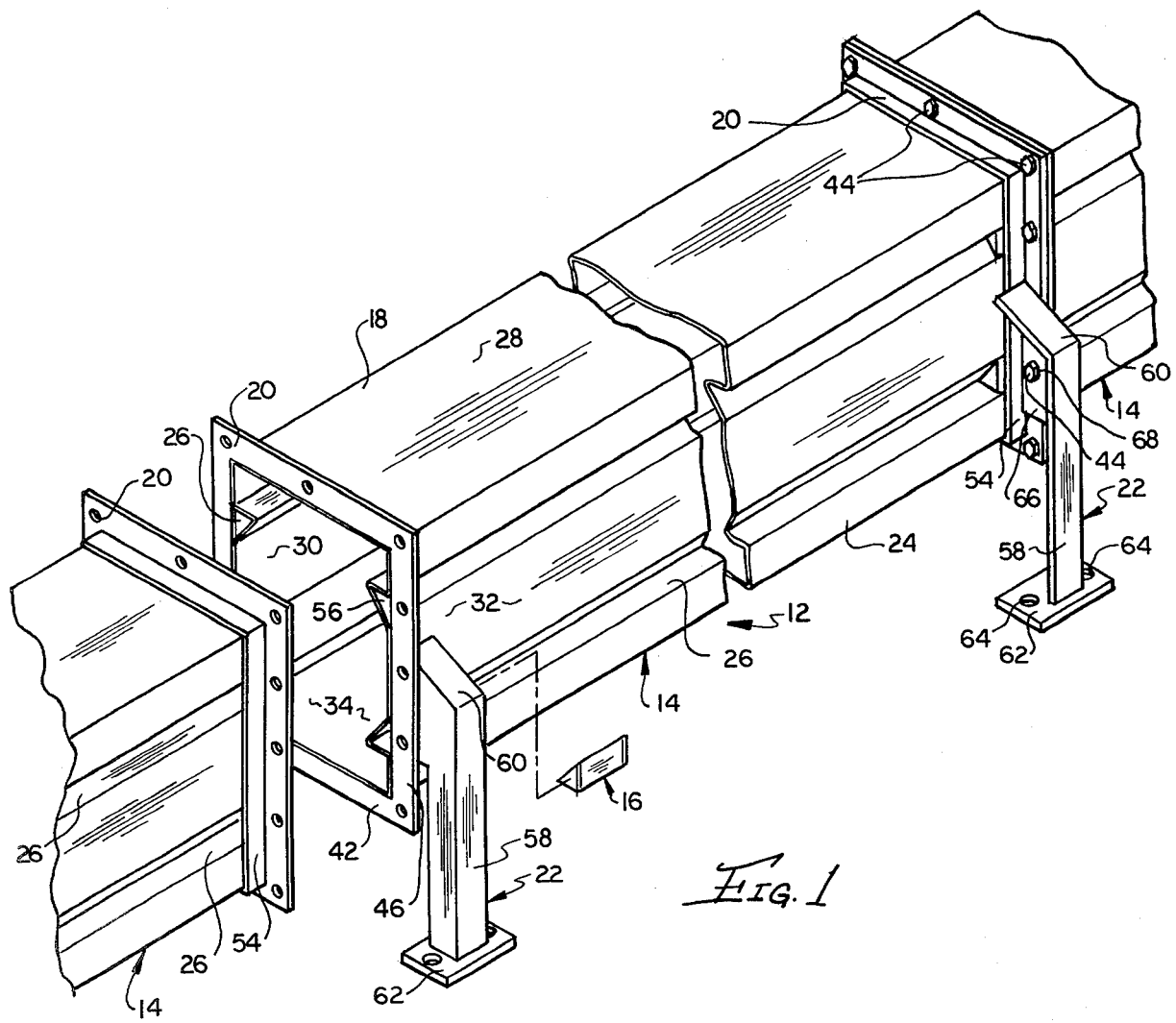
FIG. 1 is a perspective view of a plurality of trough structures being interconnected by the means for aligning and securing adjacent conveyor trough structures of this invention.
Figure 2:
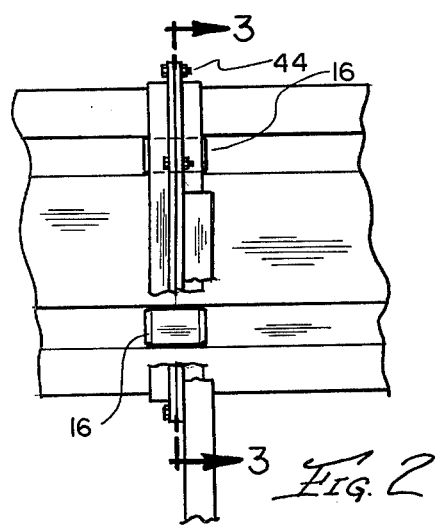
FIG. 2 is a fragmentary side elevational view of the means for aligning and securing adjacent conveyor trough structures of this invention.

FIGS. 7, 8, and 9 are fragmentary side elevational views showing the steps in utilizing the means for aligning and securing adjacent conveyor trough structures of this invention.

The following is a discussion and description of preferred specific embodiments of the new means for aligning and securing adjacent conveyor trough structures of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail and, in particular to FIG. 1, a means for aligning and securing adjacent conveyor trough structures of this invention, indicated generally at 12, includes a plurality of interconnected conveyor trough means 14 aligned with each other with the aid of alignment and anchor wedge members 16. A grain type conveyor system is constructed in individual conveyor trough means 14 which are assembled at site of usage. A problem arises wherein the adjacent conveyor trough means 14 are not accurately aligned as such causes undue wear on the conveyor chain structure and high noise level. The means for aligning and securing adjacent conveyor trough structures 12 of this invention is operable to overcome this problem by providing a simple device to assure positive alignment of adjacent ends of the conveyor trough means 14.

As shown in FIG. 1, each conveyor trough means 14 includes a main conveyor assembly 18; a connector flange assembly 20 secured to each outer end of the main conveyor assembly 18, and a plurality of support leg assemblies 22 secured to the connector flange assemblies 20. The main conveyor assembly 18 includes a main body member 24 having opposed, integral sets of conveyor chain support members 26.

The main body member 24 is of a generally square box shape having a top wall 28; opposed upright sidewalls 30, 32, and a bottom wall 34. The bottom wall 34 cooperates as a retainer for moving grain or the like longitudinally of the conveyor trough means 14 through the use of the conveyor chain structure (not shown).

Figure 3:
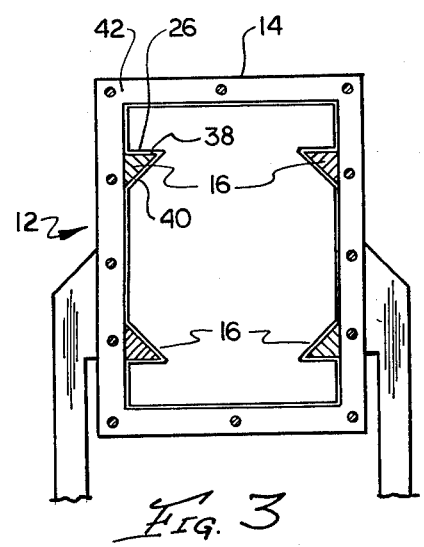
FIG. 3 is a sectional view taken along line 3—3 in FIG. 2.

As noted in FIGS. 1 and 3, the conveyor chain support members 26 are formed as an integral part of the respective sidewalls 30, 32, and extends the entire length of the main body member 24 to add strength thereto.

As best noted in transverse cross section, each conveyor chain support member 26 includes a triangular shaped main body section 36. Each main body section 36 includes a horizontal wall section 38 secured at one edge to a respective sidewall 30, 32 and at the other edge to an inclined wall section 40. The other edge of the inclined wall section 40 is integral with a respective sidewall 30, 32. Therefore, the inclined wall section 40 and horizontal wall section 38 forms a right angled triangle in transverse cross section with a plane of the respective sidewalls 30, 32.

Each connector flange assembly 20 includes a main flange member 42 connectable to an adjacent one thereof by a plurality of nut and bolt members 44. The main flange member 42 is constructed of angle iron material and secured as by welding to outer respective ends of the main body member 24. An outer leg 46 of the main flange member 42 is in a common vertical plane and formed with a plurality of spaced holes 48 to receive the nut and bolt members 44 therethrough as well be explained. Adjacent outer legs 46 of conveyor trough means 14 to be interconnected are placed in contact prior to insertion of the nut and bolt members 44 through the aligned holes 48.

As seen in FIG. 7, the nut and bolt members 44 include a bolt member 50 adapted to receive a nut member 52 thereon for interconnection in a conventional manner.

It is noted that the main flange member 42 has an inner leg 54 that cooperates with the horizontal wall section 38 and the inclined wall section 40 to form a wedge receiving area 56 therebetween. As each main body section 36 is formed in the respective sidewalls 30, 32 by a pressing action, they are accurately formed. As the inner leg 54 is secured against a respective sidewall 30, 32, the wedge receiving areas 56 are accurately duplicated in each conveyor trough means 14 which is important for reasons to become obvious.

As seen in FIG. 1, such support leg assembly 22 includes (1) a main leg member 58; (2) a connector end section 60 integral with an upper end of the main leg member 58; and (3) a horizontal support plate 62 secured to a lower end of the main leg member 58. The horizontal support plate 62 is operable to contact a support surface and is provided with a pair of spaced holes 64. It is obvious that bolt members could be placed through the holes 64 for anchoring to the support surface if so desired.

The main leg member 58 is preferably constructed of an angle iron material. The connector end section 60 has a vertical connector plate 66 with a hole 68 therein for connection by one of the nut and bolt members 44 to the outer legs 46 of the adjacent main flange members 42.

As shown in FIGS. 5 and 6, the alignment and anchor wedge member 16 includes a main body section 70 having integral tapered outer end sections 72, 74. The main body section 70 is of a right triangle shape in transverse cross section having two wall sections 76 and 78 perpendicular to each other and joined by another wall section 80.

The tapered outer end sections 72, 74 extend about a half inch inwardly from outer end wall sections 82. The tapered end sections 72, 74 aid in alignment and use thereof in a manner to be explained.

It is noted that the right triangular cross section of the alignment and anchor wedge member 16 is of a substantial similar shape and size of the right triangular area formed by the horizontal wall section 38, the inclined wall section 40, and the inner leg 54 of the main flange member 42.

USE AND OPERATION OF THE INVENTION

The grain type conveyor systems are normally shipped to location with a plurality of conveyor trough means 14; a box of nut and bolt members 44; and a set of four (4) alignment and anchor wedge members 16 for each end of the conveyor trough means 14 to be joined together.

The first step is to abutt a pair of the conveyor trough means 14 so as to have the outer legs 46 of the adjacent main flange members 42 next to each other. As noted in FIG. 7, the holes 48 in the outer legs 46 are aligned so as to receive the bolt members 50 therethrough. At the same time, the support leg assemblies 22 are connected to the respective nut and bolt members 44 to hold the conveyor trough means 14 in an elevated position as shown in FIG. 1.

The nut members 52 are then loosley threaded on the bolt members 50 as shown in FIG. 8.

The next step is to insert an alignment and anchor wedge member 16 into each of the wedge receiving areas 56 formed between (1) the inner leg 54 of the main flange member 42; (2) the horizontal wall section 38; and (3) the inclined wall section 40. The wedge receiving area 56 and the alignment and anchor wedge member 16 are of substantially the same size so that the alignment and anchor wedge members 16 have to be driven into the wedge receiving areas 56. This achieves alignment of the top surfaces of the horizontal wall sections 38 which is of upmost importance.

Finally, the nut and bolt members 44 are tightened to achieve the aligned connection of adjacent ones of the conveyor trough means 14. These steps are repeated for the length of the grain type conveyor system.

It is noted that the means for aligning and securing adjacent conveyor trough structures of this invention is simple to use, reliable in operation, and achieves a sturdy conveyor system. The connector flange assemblies can have the spaced holes in the outer legs with greater tolerances as the alignment and anchor wedge members achieve the alignment and not the bolt members in the spaced holes.

While the invention has been described in conjunction with preferred specific embodiments thereof, it will be understood that this description is intended to illustrate and not to limit the scope of the invention, which is defined by the following claims.

I claim:

1. Means for aligning and securing adjacent conveyor trough structures, comprising:

(a) a plurality of conveyor trough means connected at adjacent ends thereof;

(b) each conveyor trough means having a housing with a top wall, a bottom wall, and parallel upright sidewalls;

(c) each of said sidewalls having a wedge receiving area at said adjacent ends of said conveyor trough means;

(d) said adjacent ends having a connector flange assembly having an inner leg mounted against a respective one of said sidewalls to form an outer wall of said wedge receiving area;

(e) said wedge receiving areas of said sidewalls having a conveyor chain support member therein being an indentation having a first upper wall section which is adapted to support a first portion of a conveyor chain structure thereon;

(f) an alignment and anchor wedge member mounted in each of said wedge receiving areas and against a respective one of said inner legs under force to place adjacent ones of said first upper wall sections in alignment to place an upper surface of said first upper wall sections in a common plane;

(g) said sidewalls having formed said conveyor chain support member therein being a triangular shaped indentation;

(h) said adjacent ends of said conveyor trough means having said connector flange assembly mounted about its periphery;

(i) said connector flange assembly having an outer leg in a vertical plane to be connected to adjacent ones of said outer legs; and (j) said outer legs of abutting ones of said conveyor trough means interconnected by connector members but not requiring precision alignment thereof as said first upper wall sections are aligned by said alignment and anchor wedge members.

2. Means for aligning and securing adjacent conveyor trough structures as described in claim 1, wherein:

(a) said conveyor chain support member having said first upper wall section being horizontal and integral with an inclined wall section forming a right triangle in cooperation with said inner leg.

3. Means for aligning and securing adjacent conveyor trough structures as described in claim 2, wherein:

(a) said alignment and wedge member of a right triangular shape in transverse cross section to fit in a wedge type action in said indentations of said conveyor chain support members and firmly contact respective adjacent ones of said first horizontal wall sections, said inclined wall sections, and said inner legs of said connector flange assemblies.

4. Means for aligning and securing adjacent conveyor trough structures as described in claim 3, wherein:

(a) said alignment and wedge member having one end thereof tapered about its periphery for easy alignment and forced insertion in said wedge receiving area.

5. Means for aligning and securing adjacent conveyor trough structures, comprising:

(a) a plurality of conveyor trough means connected at adjacent ends thereof;

(b) each conveyor trough means having a housing with a top wall, a bottom wall, and parallel upright sidewalls;

(c) each of said sidewalls having a wedge receiving area at said adjacent ends of said conveyor trough means;

(d) said adjacent ends having a connector flange assembly having an inner leg mounted against a respective one of said sidewalls to form an outer wall of said wedge receiving area;

(e) said wedge receiving areas of said sidewalls having a conveyor chain support member therein being an indentation having a first upper wall section which is adapted to support a first portion of a conveyor chain structure thereon;

(f) an alignment and anchor wedge member mounted in each of said wedge receiving areas and against a respective one of said inner legs under force to place adjacent ones of said first upper wall sections in alignment to place an upper surface of said first upper wall sections in a common plane;

(g) said sidewalls each having upper and lower ones of said conveyor chain support members therein;

(h) said adjacent ends of said conveyor trough means having said connector flange assemblies mounted about its periphery;

(c) each of said sidewalls having said wedge receiving areas at upper and lower areas at said adjacent ends of said conveyor trough means; and (d) said wedge receiving areas being said conveyor chain support members having said first upper wall sections to support the first portion of the conveyor chain structure.

* * * * *